US006701777B2

(12) United States Patent
Yamaguchi et al.

(10) Patent No.: US 6,701,777 B2
(45) Date of Patent: Mar. 9, 2004

(54) LEAK DETERMINING APPARATUS, LEAK DETERMINING METHOD, AND ENGINE CONTROL UNIT FOR AN EVAPORATED FUEL TREATMENT SYSTEM

(75) Inventors: Takashi Yamaguchi, Saitama-ken (JP); Takashi Isobe, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/099,667

(22) Filed: Mar. 14, 2002

(65) Prior Publication Data

US 2002/0129643 A1 Sep. 19, 2002

(30) Foreign Application Priority Data

Mar. 14, 2001 (JP) ....................................... 2001-072892

(51) Int. Cl.[7] ............................ G01M 3/02; G01M 3/26

(52) U.S. Cl. ......................... 73/49.7; 73/40.5 R; 73/40; 73/118.1

(58) Field of Search ......................... 73/49.7, 40, 118.1, 73/49.2, 40.5 R, 42.7

(56) References Cited

U.S. PATENT DOCUMENTS 5,629,477 A * 5/1997 Ito ............................ 73/118.1
5,679,890 A * 10/1997 Shinohara et al. ......... 73/118.1
5,750,888 A * 5/1998 Matsumoto et al. ....... 73/118.1
6,016,690 A * 1/2000 Cook et al. .................. 73/49.2
6,044,314 A * 3/2000 Cook et al. ................... 701/31
6,073,487 A * 6/2000 Dawson ..................... 73/118.1
6,082,337 A * 7/2000 Fujimoto et al. ........... 123/520
6,089,081 A * 7/2000 Cook et al. ................ 73/118.1
6,105,556 A * 8/2000 Takaku et al. .............. 123/520
6,119,663 A * 9/2000 Okuma ....................... 123/520
6,164,123 A * 12/2000 Corkill ....................... 73/49.7
6,176,118 B1 * 1/2001 Kidokoro et al. .............. 73/40
6,182,642 B1 * 2/2001 Ohkuma ..................... 123/520
6,216,674 B1 * 4/2001 Corkill ....................... 123/520
6,223,732 B1 * 5/2001 Isobe et al. ................. 123/520
6,283,098 B1 * 9/2001 Corkill ....................... 123/520
6,343,505 B1 * 2/2002 Cook et al. ................ 73/118.1
6,354,143 B1 * 3/2002 Isobe et al. .................. 73/49.7
6,382,017 B1 * 5/2002 Majkowski et al. ......... 73/49.7
6,474,148 B2 * 11/2002 Takagi et al. ............. 73/118.1

FOREIGN PATENT DOCUMENTS

JP 6-159157 6/1994
JP 2000-110674 4/2000

* cited by examiner

*Primary Examiner*—Hezron Williams
*Assistant Examiner*—David Rogers
(74) *Attorney, Agent, or Firm*—Lahive & Cockfield, LLP

(57) ABSTRACT

A leak determining apparatus for an evaporated fuel treatment system is provided for executing a leak determination for an evaporated fuel treatment system without suspending it even in such a condition that variations in fuel could occur, thereby accurately providing a leak determination result. The leak determining apparatus calculates a reference differential pressure difference DDPZ as a difference between differential pressures of an inner tank pressure PTANK detected at two times in a leak check mode, i.e., a differential pressure DPZ2 and a differential pressure DPZ1 detected a predetermined slosh determination time before, and compares the reference differential pressure difference DDPZ with a slosh determining threshold value DDPZG to determine the presence or absence of sloshing. When the sloshing occurs, the leak determining apparatus calculates a second differential pressure DP2 using an inner tank pressure PTANK corrected with a slosh correction value DDPZHOSEI, and executes a leak determination based on the second differential pressure.

4 Claims, 7 Drawing Sheets

LEAK DETERMINING APPARATUS, LEAK DETERMINING METHOD, AND ENGINE CONTROL UNIT FOR AN EVAPORATED FUEL TREATMENT SYSTEM

BACKGROUND OF THE INVENTION

1. Field of the Invention

The present invention relates to a leak determining apparatus, a leak determining method and an engine control unit for an evaporated fuel treatment system, which are adapted to determine the presence or absence of a leak in the evaporated fuel treatment system of an internal combustion engine in which an evaporated fuel generated in a fuel tank is temporarily stored in a canister, and supplies to an intake system as appropriate.

2. Description of the Prior Art

Conventionally, a leak determining apparatus of the type mentioned above is known, for example, from that described in Laid-open Japanese Patent Application No. Hei 6-159157. This evaporated fuel treatment system comprises a canister, a fuel tank, a charge passage, a purge passage, and the like. The canister is connected to a fuel tank through a vapor passage, and connected to an intake pipe of an internal combustion engine through the purge passage. The charge passage is provided with a pressure sensor for detecting a pressure within a space defined by the charge passage and fuel tank (hereinafter called the "inner tank pressure").

This leak determining apparatus determines the presence or absence of a leak in the evaporated fuel treatment system, and because of possible variations in the fuel level (hereinafter called the "sloshing"), such as a large amount of evaporated fuel generated at the time of determination, additionally determines the presence or absence of sloshing. The sloshing determination for determining the presence or absence of sloshing involves detecting an inner tank pressure at regular time intervals, determining that no sloshing is present when a difference between a current value and the preceding value of the detected inner tank pressure is less than a predetermined value, and determining that sloshing is present when the difference is equal to or larger than the predetermined value. Then, when it is determined that no sloshing is present, the leak determination is executed for determining the presence or absence of a leak. On the other hand, when it is determined that the sloshing is present, the leak determination is suspended for preventing an erroneous determination possibly resulting from the sloshing, and subsequently, the leak determination is kept off until the difference between detected values of the inner tank pressure decreases below the predetermined value.

The conventional leak determining apparatus described above suspends the leak determination for the evaporated fuel treatment system when determining that sloshing is present, and keeps off the leak determination until the difference between detected values of the inner tank pressure decreases below the predetermined value, so that the result of the leak determination may be provided with delay.

The above and other objects, features, and advantages of the present invention will become more apparent from the following detailed description taken in conjunction with the accompanying drawings.

OBJECT AND SUMMARY OF THE INVENTION

The present invention has been made to solve the foregoing problem, and it is an object of the invention to provide a leak determining apparatus, a leak determining method, and an engine control unit for an evaporated fuel treatment system, which are capable of executing a leak determination for an evaporated fuel treatment system without suspending it even in such a condition that variations in fuel level could occur, and capable of accurately providing a leak determination result.

To achieve the above object, according to a first aspect of the present invention, there is provided a leak determining apparatus for an evaporated fuel treatment system for temporarily adsorbing an evaporated fuel generated in a fuel tank in a canister, and supplying the evaporated fuel to an intake system of an internal combustion engine.

The leak determining apparatus according to the first aspect of the present invention is characterized by comprising pressure detecting means for detecting a pressure in the evaporated fuel treatment system; leak determining means for determining the presence or absence of a leak in the evaporated fuel treatment system in accordance with a pressure detected in the evaporated fuel treatment system during a predetermined leak determination period; fuel variation determining means for determining whether or not variations in fuel level occur in the fuel tank in accordance with a change in the pressure of the evaporated fuel treatment system detected during the leak determination period; and correcting means for correcting the value of the detected pressure for use in the leak determination based on the change in pressure detected in the evaporated fuel treatment system when the fuel variation determining means determines that the variations in fuel level occur.

The leak determining apparatus for an evaporated fuel treatment system according to the first aspect of the present invention determines the presence or absence of a leak in the evaporated fuel treatment system in accordance with the pressure in the evaporated fuel treatment system detected during the predetermined leak determination period. The leak determining apparatus also determines whether or not variations in fuel level occur in the fuel tank in accordance with a change in the pressure in the evaporated fuel treatment system detected during the leak determination period, and corrects the value of the detected pressure for use in the leak determination based on the change in the pressure detected in the evaporated fuel treatment system when determining, as a result, that the variations in fuel level occur. In this manner, since the value of the detected pressure for use in the leak determination is corrected based on the change in the pressure caused by the variations in fuel level, the leak determination can be appropriately accomplished even if the variations in fuel level occur, unlike the prior art, by reflecting the change in the pressure caused by the variations in fuel level to maintain the determination accuracy. In this manner, the leak determining apparatus can carry out the leak determination for the evaporated fuel treatment system without suspension even under condition that the variations in fuel level occur, and thereby rapidly and accurately provide a leak determination result.

To achieve the above object, according to a second aspect of the present invention, there is provided a leak determining apparatus for an evaporated fuel treatment system for temporarily adsorbing an evaporated fuel generated in a fuel tank in a canister, and supplying the evaporated fuel to an intake system of an internal combustion engine.

The leak determining apparatus according to the second aspect of the present invention is characterized by comprising a pressure detecting module for detecting a pressure in the evaporated fuel treatment system; a leak determining module for determining the presence or absence of a leak in the evaporated fuel treatment system in accordance with a pressure detected in the evaporated fuel treatment system during a predetermined leak determination period; a fuel level variation determining module for determining whether or not variations in fuel occur in the fuel tank in accordance with a change in the pressure of the evaporated fuel treatment system detected during the leak determination period; and a correcting module for correcting the value of the detected pressure for use in the leak determination based on the change in pressure detected in the evaporated fuel treatment system when the fuel variation determining module determines that the variations in fuel level occur.

This leak determining apparatus provides the same advantageous effects as described above concerning the leak determining apparatus according to the first aspect of the present invention.

To achieve the above object, according to a third aspect of the present invention, there is provided a leak determining method for an evaporated fuel treatment system for temporarily adsorbing an evaporated fuel generated in a fuel tank in a canister, and supplying the evaporated fuel to an intake system of an internal combustion engine.

The leak determining method according to the third aspect of the present invention is characterized by comprising the steps of detecting a pressure in the evaporated fuel treatment system; for determining the presence or absence of a leak in the evaporated fuel treatment system in accordance with a pressure detected in the evaporated fuel treatment system during a predetermined leak determination period; determining whether or not variations in fuel level occur in the fuel tank in accordance with a change in the pressure of the evaporated fuel treatment system detected during the leak determination period; and correcting the value of the detected pressure for use in the leak determination based on the change in pressure detected in the evaporated fuel treatment system when determining that the variations in fuel level occur.

This leak determining method provides the same advantageous effects as described above concerning the leak determining apparatus according to the first aspect of the present invention.

To achieve the above object, according to a fourth aspect of the present invention, there is provided an engine control unit including a control program for causing a computer to carry out a leak determination for an evaporated fuel treatment system for temporarily adsorbing an evaporated fuel generated in a fuel tank in a canister, and supplying the evaporated fuel to an intake system of an internal combustion engine.

The engine control unit according to the fourth aspect of the present invention is characterized in that the control program causes the computer to detect a pressure in the evaporated fuel treatment system; determine the presence or absence of a leak in the evaporated fuel treatment system in accordance with a pressure detected in the evaporated fuel treatment system during a predetermined leak determination period; determine whether or not variations in fuel level occur in the fuel tank in accordance with a change in the pressure of the evaporated fuel treatment system detected during the leak determination period; and correct the value of the detected pressure for use in the leak determination based on the change in pressure detected in the evaporated fuel treatment system when determining that the variations in fuel level occur.

This engine control unit provides the same advantageous effects as described above concerning the leak determining apparatus according to the first aspect of the present invention.

The above and other objects, features, and advantages of the present invention will become more apparent from the following detailed description taken in conjunction with the accompanying drawings.

DETAILED DESCRIPTION OF THE EMBODIMENT

Figure 1:
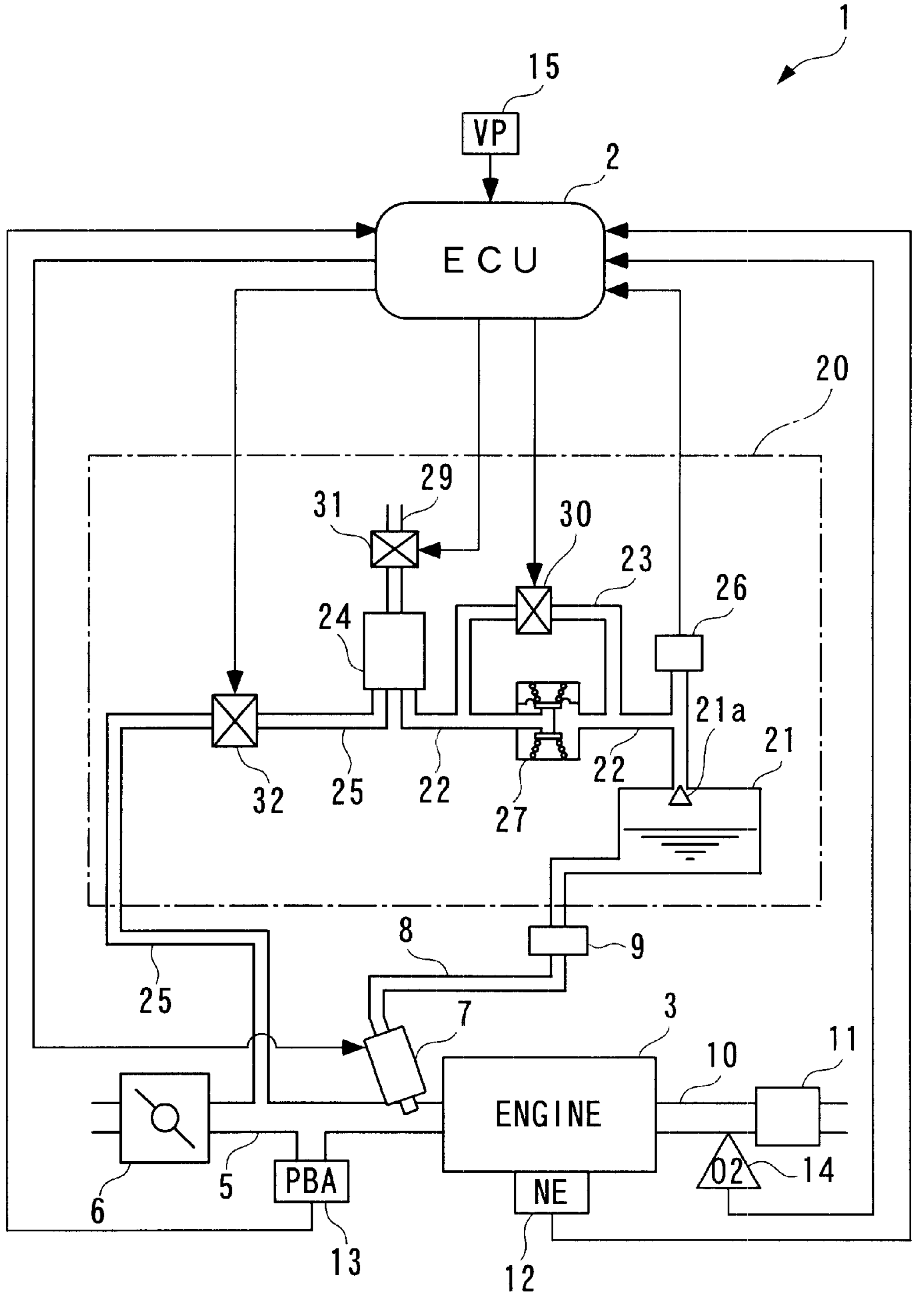
FIG. 1 is schematic diagram illustrating the configuration of an evaporated fuel treatment system, to which a leak determining apparatus according to one embodiment of the present invention is applied, and an internal combustion engine which comprises the evaporated fuel treatment system.

In the following, a leak determining apparatus for an evaporated fuel treatment system according to one embodiment of the present invention will be described with reference to the accompanying drawings. FIG. 1 generally illustrates the configuration of an evaporated fuel treatment system to which the leak determining apparatus of this embodiment is applied, and an internal combustion engine which comprises the evaporated fuel treatment system. The leak determining apparatus 1 determines the presence or absence of a leak in the evaporated fuel treatment system 2 of an internal combustion engine (hereinafter called the "engine"), and comprises an ECU 2. Details on the evaporated fuel treatment system 20 and ECU 2 will be described later.

The engine 3 is a gasoline engine equipped in a vehicle, not shown. An engine rotational speed sensor 12 is mounted on a body of the engine 3 for detecting an engine rotational speed NE and sending a signal indicative of a detected engine rotational speed NE to the ECU 2.

An intake pipe 5 (intake system) of the engine 3 is provided with a throttle valve 6, and an absolute inner intake pipe pressure sensor 13 mounted at a location downstream of the throttle valve 6. The absolute inner intake pipe pressure sensor 13 detects an absolute inner intake pipe pressure PBA in the intake pipe 5, and sends a signal indicative of a detected absolute inner intake pipe pressure PBA to the ECU 2.

Further, at a location in the intake pipe 5 downstream of the absolute inner intake pipe sensor 13, an injector 7 is mounted to face an intake port, not shown. A fuel injection time TOUT, in which the injector 7 is opened, is controlled by the ECU 2. The injector 7 is also connected to a fuel tank 21 through a fuel supply pipe 8. A fuel pump 9 is provided midway in the fuel supply pipe 8 for pumping a fuel to the injector 7.

On the other hand, at a location in the intake pipe 10 of the engine 3 upstream of a catalyzer 11, an O2 sensor 14 is mounted for detecting an oxygen concentration in an exhaust gas upstream of the catalyzer 11, and outputting a detection signal in accordance with a detected oxygen concentration to the ECU 2. The ECU 2 calculates an air/fuel ratio correction coefficient KO2 for use in calculating the aforementioned fuel injection time TOUT based on the detection signal of the O2 sensor 14.

The ECU 2 is further supplied with a detection signal indicative of the velocity of the vehicle (vehicle velocity) VP from a vehicle velocity sensor 15.

The aforementioned evaporated fuel treatment system 20 temporarily stores an evaporated fuel generated in the fuel tank 21 in a canister 24, and emits the stored evaporated fuel into the intake pipe 5 as appropriate, and comprises a charge passage 22, a bypass passage 23, the canister 24, a purge passage 25, and the like.

The canister 24 is connected to the fuel tank 21 through the charge passage 22, so that an evaporated fuel generated in the fuel tank 21 is sent to the canister 24 through the charge passage 22. A pressure sensor 26 (pressure detecting means) is disposed at a location in the charge passage 22 near the fuel tank 21. The pressure sensor 26 is comprised, for example, of a piezoelectric device for detecting the pressure in the charge passage 22 and outputting a signal indicative of a detected pressure to the ECU 2. Since the pressure in the charge passage 22 is substantially equal to the pressure in the fuel tank 21 in a normal state, this pressure is hereinafter called the "inner tank pressure" PTANK (pressure in the evaporated fuel treatment system).

A two-way valve 27 is disposed between the pressure sensor 26 in the charge passage 22 and the canister 24. This two-way valve 27 is comprised of a combination of mechanical valves which are a positive pressure valve and a negative pressure valve of diaphragm type. The positive pressure valve is configured to be opened when the inner tank pressure PTANK is higher than the atmospheric pressure by a predetermined pressure, and the opened positive pressure valve permits the evaporated fuel in the fuel tank 21 to be sent to the canister 24. The negative pressure valve in turn is configured to be opened when the inner tank pressure PTANK is lower than the pressure in the canister 24 by a predetermined pressure, and the opened negative pressure valve permits the evaporated fuel stored in the canister 24 to be returned to the fuel tank 21.

The bypass passage 23 is provided to bypass the two-way valve 27, and is connected to a location of the charge passage 22 between the canister 24 and two-way valve 27, and to a location between the canister 24 the pressure sensor 26. A bypass valve 30 is disposed midway in the bypass passage 23. The bypass valve 30, which is comprised of a normally closed type electromagnetic valve, normally closes the bypass passage 23, and is opened when energized under control of the ECU 2 to open the bypass passage 23.

The fuel tank 21 is also provided with a float valve **21*a*. The float valve 21*a* is provided for opening and closing a port of the charge passage 22 toward the fuel tank 21, and normally opens the port, and closes the port when the fuel tank 21 is filled with a fuel or when the fuel in the tank 21 varies, thereby preventing the fuel from flowing into the charge passage 22**.

The canister 24 contains active carbons by which an evaporated fuel is adsorbed. An atmospheric passage 29, open to the atmosphere, is connected to the canister 24. The atmospheric passage 29 is provided with a vent shut valve 31 for opening and closing the atmospheric passage 29. The vent shut valve 31 is comprised of a normally opened type electromagnetic valve, and normally keeps the atmospheric passage 29 in an opened state, and closes the atmospheric passage 29 when energized under control of the ECU 2.

A purge control valve 32 is disposed midway in the aforementioned purge passage 25 for opening and closing the same. The purge control valve 32 is comprised of an electromagnetic valve, the opening of which continuously varies in response to a duty ratio of a driving signal from the ECU 2. When the bent shut valve 31 is opened, the purge control valve 32 is opened to send the evaporated fuel adsorbed by the canister 24 into the intake pipe 5 by the action of a negative pressure in the intake pipe 5. The ECU 2 controls the opening of the purge control valve 32 based on the duty ratio of the driving signal to control the rate of evaporated fuel sent from the canister 24 into the intake pipe 5, i.e., the purge rate.

The ECU 2 (leak determining means, fuel level variation determining means, correcting means) is comprised of a microcomputer which includes an I/O interface, a CPU, a RAM, a ROM and the like. The detection signals from a variety of aforementioned sensors 12–15 and 26 are inputted to the CPU after they have undergone an A/D conversion and waveform reshaping. The CPU determines a driving state of the engine 3 based on these input signals, drives a variety of valves 30–32 in accordance with a control program previously stored in the ROM, data stored in the RAM, and the like, and executes leak determination processing for the evaporated fuel processing system 20, described below.

Figure 2:
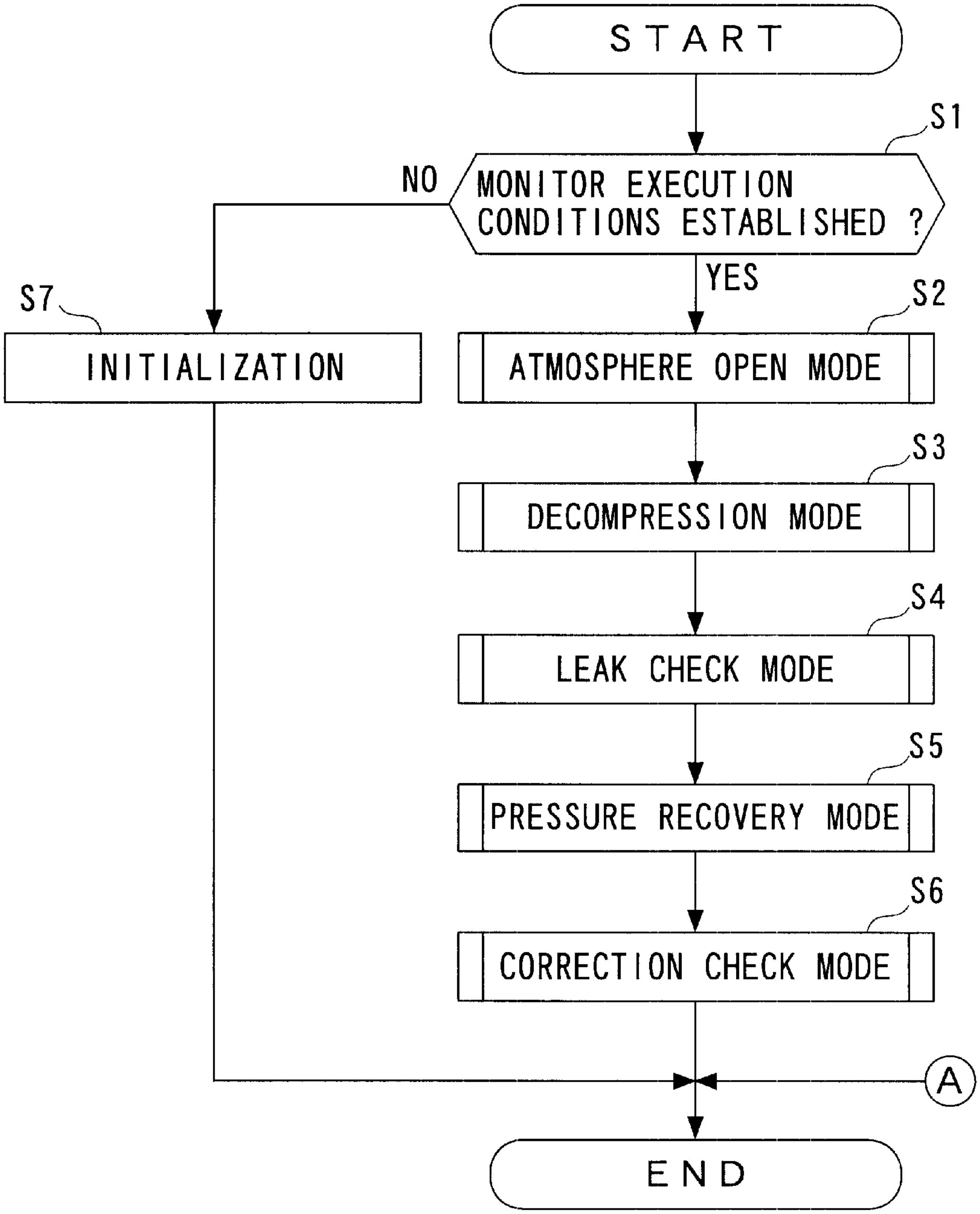
FIG. 2 is a flow chart illustrating a main routine of leak determination processing executed by the leak determining apparatus.

Now, the leak determination processing will be described with reference to FIGS. 2–7. This processing determines the presence or absence of a leak in a portion upstream of the two-way valve 27 and bypass valve 30 in the evaporated fuel treatment system 20. FIG. 2 illustrates a main routine of this processing. This processing is executed every predetermined time (for example, 80 msec) by setting a timer, and the leak determination in this processing is executed only once from the start to the end of the operation of the engine 3.

First at step 1 (in FIG. 2, abbreviated as S1. Such abbreviation applies to the subsequent figures), it is determined whether or not monitor execution conditions are established. This monitor execution condition is provided for determining whether or not conditions for executing the leak determination processing are established. The monitor execution conditions are determined to be established when all of the following conditions (1)–(4), for example, are established:

(1) a purge control is under execution by the purge control valve 32;

(2) the engine 3 is in a predetermined steady-state operating state (for example, determined by the absolute inner intake pipe pressure PBA, engine rotational speed NE, or the like);

(3) the vehicle is cruising, where the vehicle velocity varies little; and (4) an air/fuel ratio correction coefficient KO2 is equal to or larger than a predetermined value, and the purge fuel less affects the air/fuel ratio A/F.

If the determination result at step 1 is YES, indicating that all of the conditions (1)–(4) are established, atmosphere open mode processing, decompression mode processing, leak check mode processing, pressure recovery mode processing, and correction check mode processing are executed in order at steps S2–S6, regarding that the leak determination can be executed, followed by termination of this processing. Details on a variety of the mode processing will be described later.

On the other hand, if the determination result at step S1 is NO, indicating that the monitor execution condition is not established, the routine proceeds to step S7, where initialization is executed, followed by termination of the leak determination processing. Though not shown, the initialization involves setting both a timer value T of a leak determination timer and a timer value TPHEN of a slosh determination timer to a value 0. The leak determination timer and slosh determination timer are each comprised of an up-count type timer.

In the atmosphere open mode processing at step S2, the bypass valve 30 and vent shut valve 31 are kept opened, while the purge control valve 32 is kept closed, thereby making the inner tank pressure PTANK substantially equal to the atmosphere.

In the decompression mode processing at step S3 next to step S2, the bypass valve 30 is kept opened, while the bent shut valve 31 is kept closed, and the purge control valve 32 is duty controlled for a predetermined decompression time T1 to decompress the evaporated fuel treatment system 20. Then, after the decompression, the timer value T of the leak determination timer is set to zero, and a leak check mode execution enable flag F_EVAP2 is set to "1" for indicating that the leak check mode processing can be executed.

Figure 3:
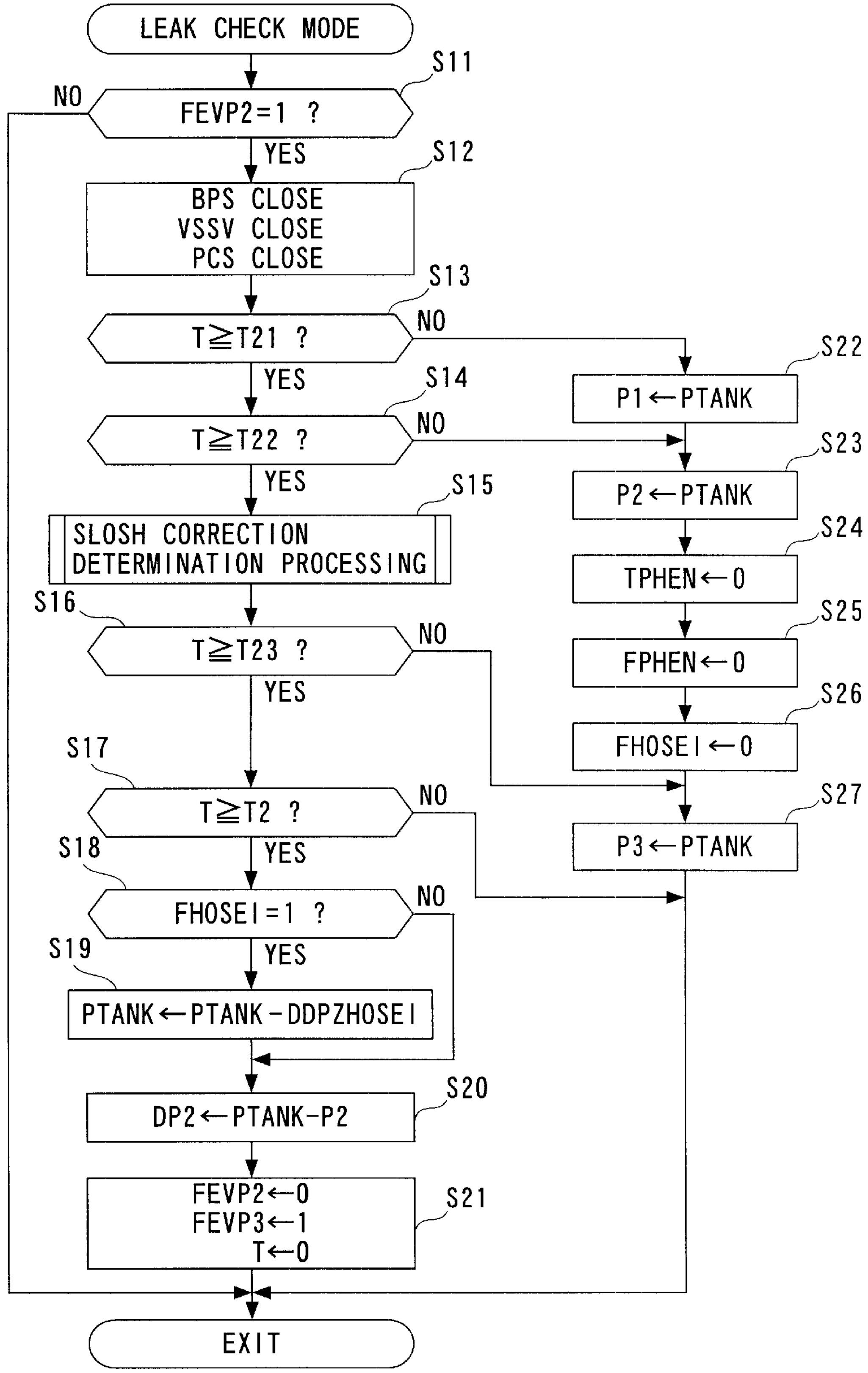
FIG. 3 is a flow chart illustrating a subroutine in a leak check mode in FIG. 2.

Next, details on the leak check mode processing at step S4 will be described with reference to FIG. 3. First at step S11, it is determined whether or not the leak check mode execution enable flag F_EVAP2 is "1." If the determination result at step S11 is NO, the leak check mode processing is terminated. On the other hand, if the determination result at step S11 is YES, indicating that the evaporated fuel processing system S20 can execute a leak check mode, the subroutine proceeds to step S12, where the bypass valve (abbreviated as "BPS" in FIG. 3. This abbreviation applies to the subsequent figures) 30, vent shut valve (abbreviated as "VSSV" in FIG. 3. This abbreviation applies to the subsequent figures) 31, and purge control valve (abbreviated as "PCS" in FIG. 3. This abbreviation applies to the subsequent figures) 32 are all kept closed. In this manner, the evaporated fuel processing system 20 transitions to the leak check mode.

Then, the subroutine proceeds to step S13, where it is determined whether or not the timer value T of the leak determination timer is equal to or larger than a predetermined time T21 (for example, 0.5 sec). If the determination result at step 13 is NO, i.e., if the predetermined time T21 has not elapsed after the transition to the leak check mode, the leak check mode processing is terminated after executing steps S20–S24, described below.

Specifically, an inner tank pressure detected by the pressure sensor 26 at the current time (hereinafter called the "current inner tank pressure value") PTANK is set as a first and a second detected pressure P1, P2 (steps S22, S23), then the timer value TPHEN of the slosh correction timer is set to zero (step S24), a differential pressure calculation end flag FPHEN and a correction value calculation end flag FHOSEI are respectively set to "0" (steps S25, S26), and the current inner tank pressure value PTANK is set as a third detected pressure P3 (step S27), followed by termination of the leak check mode processing.

On the other hand, if the determination result at step 13 is YES, i.e., if the first predetermined time T21 has elapsed after the transition to the leak check mode, the subroutine proceeds to step S14, where it is determined whether or not the timer value T is equal to or larger than a second predetermined time T22 (for example, 5 sec) which is longer than the first predetermined time T21. If the determination result at step S14 is NO, i.e., if the second predetermined time T22 has not elapsed after the transition to the leak check mode, the aforementioned steps S23–S27 are executed, followed by termination of the leak check mode processing. On the other hand, if the determination result at step S13 is YES, i.e., if the second predetermined time T22 has elapsed, the subroutine proceeds to step S15, where the slosh correction determination processing, later described, is executed.

Then, the subroutine proceeds to step S16, where it is determined whether or not the timer value T is equal to or larger than a third predetermined time T23 (for example, 30 sec) which is longer than the second predetermined time T22. If the determination result at step S16 is NO, i.e., if the third predetermined time T23 has not elapsed after the transition to the leak check mode, the leak check mode processing is terminated after the aforementioned step S27 is executed. On the other hand, if the determination result at step S16 is YES, i.e., if the third predetermined time T23 has elapsed, the subroutine proceeds to step S17, where it is determined whether or not the time value T is equal to or larger than a predetermined leak check time T2 (for example, 30.5 sec) which is longer than the third predetermined time T23.

If the determination result is NO at step S17, i.e., if the predetermined leak check time T2 has not elapsed after the transition to the leak check mode, the leak check mode processing is terminated. On the other hand if the determination result at step S17 is YES, indicating that the predetermined leak check time T2 has elapsed, the subroutine proceeds to step S18, where it is determined whether or not the correction value calculation end flag FHOSEI is "1." This correction value calculation end flag FHOSEI is set to "1" when it is determined that large variations in the fuel level, such as generation of a large amount of evaporated fuel in the fuel tank 21, i.e., sloshing occurs in the slosh correction determination processing, as described later.

If the determination result at step S18 is YES, indicating that sloshing is occurring, the subroutine proceeds to step S19, where a slosh correction value DDPZHOSEI, later described, is subtracted from the current inner tank pressure value PTANK, and the resulting value (PTANK-DDPZHOSEI) is set as the current PTANK, followed by transition to step S20. On the other hand, if the determination result at step S18 is NO, indicating that no sloshing is occurring, the subroutine proceeds to step S20, skipping step S19.

At step S20, the second detected pressure P2 is subtracted from the current inner tank pressure value PTTANK corrected at step S18, and the resulting value (PTANK-P2) is set as a second differential pressure DP2. In this manner, the second differential pressure DP2 is calculated as representing the amount of variations in the inner tank pressure PTANK between the time at which the second predetermined time T22 has elapsed from the start of the leak check mode, and the time at which the leak check mode is terminated, and if sloshing occurs in the meantime, the second differential pressure DP2 is calculated as a value which excludes an increase in the inner tank pressure PTANK resulting from the sloshing.

Next, the subroutine proceeds to step S21, where the leak check mode execution enable flag F_EVAPS2 is set to "0," the pressure recovery mode execution enable flag F_EVAP3 is set to "1" for indicating that the evaporated fuel treatment system 20 is ready for the pressure recovery mode, and the timer value T is set to zero, followed by termination of the leak check mode processing. The leak check mode execution enable flag F__EVAP2 is set to "0" at step S21, causing the determination result at the aforementioned step S11 to be NO in the next and subsequent loops of this subroutine, in which case the subroutine proceeds to the pressure recovery mode at step S5, skipping steps 12–27.

Figure 4:
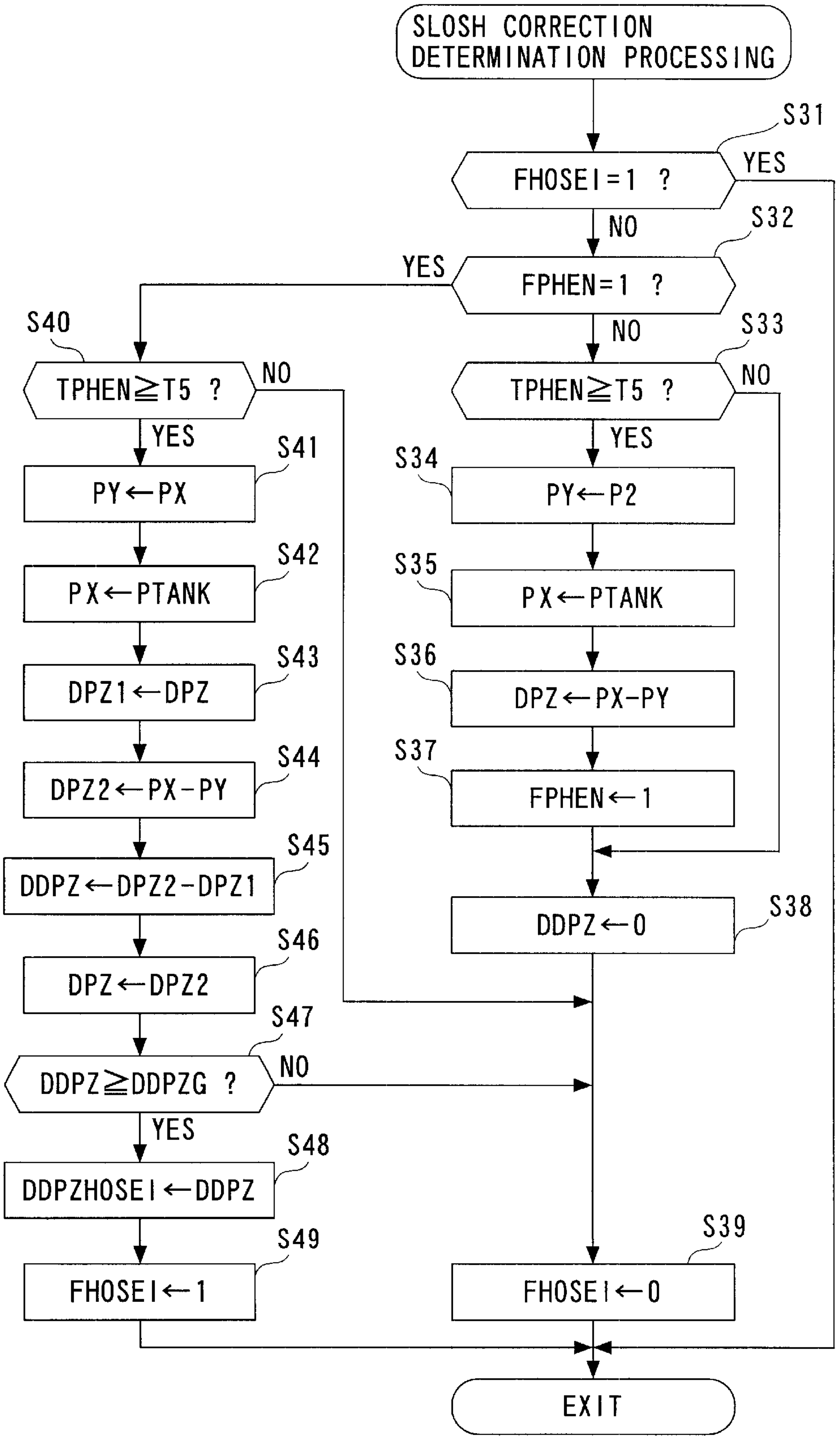
FIG. 4 is a flow chart illustrating a subroutine of slosh correction determination processing in FIG. 3.

Next, details on the slosh correction determination processing at step S15 will be described with reference to FIG. 4. The slosh correction determination processing determines whether or not sloshing occurs in the fuel tank 21, and when determining that sloshing occurs, calculates a slosh correction value DDPZHOSEI corresponding to an increase in the inner tank pressure PTANK resulting from the sloshing. In the illustrated routine, it is first determined at step S31 whether or not the correction value calculation end flag FHOSEI is "1."

If the determination result at step S31 is YES, indicating that the slosh correction value DDPZHOSEI has been calculated in response to the occurrence of sloshing, the slosh correction determination processing is terminated without further processing. On the other hand, if the determination result at step S31 is NO, the subroutine proceeds to step S32, where it is determined whether or not the differential pressure calculation end flag FPHEN is "1."

If the determination result at step S32 is NO, indicating that a reference differential pressure DPZ, later described, has not been calculated, the subroutine proceeds to step S33, where it is determined whether or not the timer value TPHEN of the slosh determination timer is equal to or larger than a predetermined slosh determination time T5 (for example, 5 sec). If the determination result at step S32 is NO, indicating that the predetermined slosh determination time has not elapsed from the start of the slosh correction determination processing, the subroutine proceeds to step S38, later described.

On the other hand, if the determination result at step S33 is YES, indicating that the predetermined slosh determination time T5 has elapsed from the start of the slosh correction determination processing, the second detected pressure P2 (i.e., the current inner tank pressure value PTANK detected at a timing earlier by the predetermined slosh determination time T5 than the current time) is set as the preceding reference pressure value PY (step S34), and the current inner tank pressure value PTANK is set as a current reference pressure value PX (step S35).

Next, the subroutine proceeds to step S36, where the preceding reference pressure value PY is subtracted from the current reference pressure value PY, and the resulting value is set as a reference differential pressure DPZ. Next, the subroutine proceeds to step S37, where the differential pressure calculation end flag FPHEN is set to "1." At step S38 subsequent to step S37 or step S33, a reference differential pressure difference DDPZ is set to "0." Next, the subroutine proceeds to step S39, where the correction value calculation end flag FHOSEI is set to "1," followed by termination of the slosh correction determination processing.

On the other hand, if the determination result at step S32 is YES, indicating that the reference differential pressure DPZ has been calculated, the subroutine proceeds to step S40, where it is determined whether or not the timer value TPHEN of the slosh determination timer is equal to or larger than the predetermined slosh determination time T5, in a similar manner to the aforementioned step S33. If the determination result at step S40 is NO, indicating that the predetermined slosh determination time T5 has not elapsed after calculating the reference differential pressure DPZ, the aforementioned step S39 is executed, followed by termination of the slosh correction determination processing.

On the other hand, if the determination result at step S40 is YES, indicating that the predetermined slosh determination time T5 has elapsed after calculating the reference differential pressure DPZ, the current reference pressure value PX (i.e., the current inner tank pressure value PTANK detected at a timing earlier by the predetermined slosh determination time T5 than the current time) is set as the preceding reference pressure value PY (step S41), the current inner tank pressure value PTANK is set as the current reference pressure value PX (step S42), and the reference differential pressure DPZ is set as the preceding reference differential pressure value DPZ1 (step S43).

Next, the subroutine proceeds to step S44, where the preceding reference pressure value PY is subtracted from the current reference pressure value PX, and the resulting value is set as the current reference differential pressure value DPZ2, and then the preceding reference differential pressure value DPZ1 is subtracted from the current reference differential pressure value DPZ2, and the resulting value is set to the reference differential pressure difference DDPZ.

Next, the subroutine proceeds to step S46, where the current reference differential pressure value DPZ2 is set as the reference differential pressure DPZ, followed by transition to step S47, where it is determined whether or not the reference differential pressure difference DDPZ is equal to or higher than a threshold value DDPZG for slosh correction. If the determination result at step S47 is NO, it is determined that no sloshing is occurring, and the aforementioned step S39 is executed for indicating to that effect, followed by termination of the slosh correction determination processing. On the other hand, if the determination result at step S47 is YES, indicating that sloshing occurs, the reference differential pressure difference DDPZ is set as the slosh correction value DDPZHOSEI (step S48), and the correction value calculation end flag FHOSEI is set to "1" (step S49), followed by termination of the slosh correction determination processing.

Consequently, the determination result at the aforementioned step S18 is YES in the next loop, in which case a correction for the inner tank pressure PTANK is executed using the slosh correction value DDPZHOSEI at the aforementioned step S19. Specifically, as described above, the slosh correction value DDPZHOSEI, which is an increase in the inner tank pressure PTANK due to the sloshing, is subtracted from the current inner tank pressure value PTANK to produce a corrected value which is set as the current inner tank pressure value PTANK, thereby making it possible to find an appropriate current inner tank pressure value PTANK which reflects a sloshing-free state, while eliminating the influence of the increase in pressure due to the sloshing.

Next, details on the pressure recovery mode processing at step S5 in FIG. 2 will be described with reference to FIG. 5. The pressure recovery mode processing, as described below, opens the bypass valve 30 and bent shut valve 31 for a predetermined pressure recovery time T3 to recover the inner tank pressure PTANK to the atmospheric pressure, and determines the presence or absence of a leak in the recovery.

Figure 5:
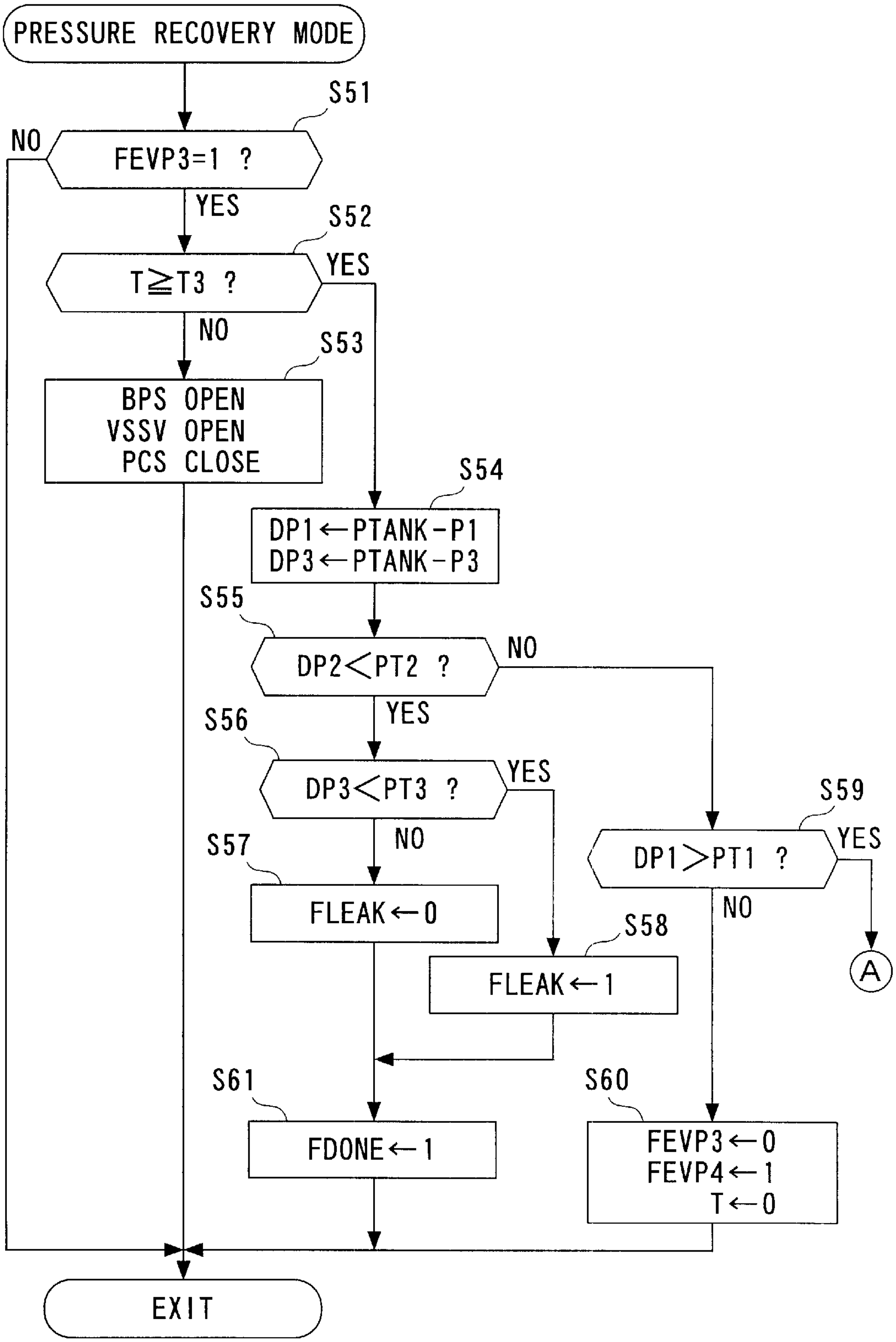
FIG. 5 is flow chart illustrating a subroutine in a pressure recovery mode in FIG. 2.

As illustrated in a subroutine of FIG. 5, it is first determined at step S51 whether or not the pressure recovery mode execution enable flag F__EVAP3 is "1." If the determination result at step S51 is NO, the pressure recovery mode processing is terminated, on the assumption that the evaporated fuel treatment system 20 is not ready for execution in the pressure recovery mode. On the other hand, if the determination result at step S51 is YES, the subroutine proceeds to step S52, where it is determined whether or not the timer value T of the leak determination timer is equal to or larger than a predetermined pressure recovery time T3 (for example, 10 sec). If the determination result at step S52 is NO, indicating that the predetermined pressure recovery time T3 has not elapsed after the transition to the pressure recovery mode, the subroutine proceeds to step S53, where the bypass valve 30 and bent shut valve 31 are kept opened, while the purge control valve 32 is kept closed, followed by termination of the pressure recovery mode processing.

On the other hand, if the determination result at step S52 is YES, indicating that the predetermined pressure recovery time T3 has elapsed after the transition to the pressure recovery mode, the subroutine proceeds to step S54, where the first detected value P1 set at the aforementioned step S20 is subtracted from the current inner tank pressure value PTANK, and the resulting value is set as a first differential pressure PD1. Also, the third detected pressure P3 set at the aforementioned step S24 is subtracted from the current inner tank pressure value PTANK, and the resulting value is set as a third differential pressure DP3. In this manner, the first differential pressure DP1 represents the amount of variations in the inner tank pressure PTANK between the time at which the first predetermined time T21 has elapsed from the start of the leak check mode and the time at which the pressure recovery mode is terminated, while the third differential pressure DP3 represents the amount of variations in the inner tank pressure PTANK between the time at which the third predetermined time T23 has elapsed from the start of the leak check mode and the time at which the pressure recovery mode is terminated.

Next, the subroutine proceeds to step S55, where it is determined whether or not the second differential pressure DP2 calculated at the aforementioned step S18 is lower than a second threshold value PT2. If the determination result at step S55 is YES, indicating that small variations have been found in the inner tank pressure PTANK in the leak check mode, the subroutine proceeds to step S56, where it is determined whether or not the third differential pressure DP3 is lower than a third threshold value PT3. If the determination result at step S56 is NO, indicating that the inner tank pressure PTANK at a predetermined time before the end of the leak check mode (for example, at time t14 in FIG. 7) is lower than the atmospheric pressure PATM by a predetermined pressure or more, it is determined that the evaporated fuel treatment system 20 is free from a leak, from the fact that the tank has been sufficiently decompressed in the decompression mode, and small variations are found in the inner tank pressure PTANK. Then, the subroutine proceeds to step S57, where a leak determination flag FLEAK is set to “0” for indicating to that effect.

On the other hand, if the determination result at step 56 is YES, indicating that the inner tank pressure PTANK at the predetermine time before the end of the leak check mode is close to the atmospheric pressure, i.e., when the tank is not largely decompressed in the decompression mode, and small variations are found in the inner tank pressure PTANK in the leak check mode, the subroutine proceeds to step S58, determining that a relatively large amount of leak is occurring in the evaporated fuel treatment system 20, where the leak determination flag FLEAK is set to “1” for indicating to that effect. At step S61, subsequent to steps S57, S58, the leak determination end flag FDONE is set to “1” for indicating that the leak determination is terminated, followed by termination of the pressure recovery mode processing.

On the other hand, if the determination result at step S55 is NO, indicating that large variations are found in the inner tank pressure PTANK in the leak check mode, the subroutine proceeds to step S59, where it is determined whether or not the first differential pressure DP1 is higher than a first threshold value PT1. If the determination result at step S59 is YES, it is assumed that due to excessively large reduction in the inner tank pressure PTANK in the decompression mode, the fuel tank 21 is filled up with a fuel, causing the float valve 21*a* to be closed. Therefore, determining that the evaporated fuel treatment system 20 is not ready for execution in the correction check mode, the pressure recovery mode processing is exited for returning to the main routine of FIG. 2, where steps S5, S6 are skipped, the leak determination is disabled, and the leak determination processing is terminated.

On the other hand, if the determination result at step S59 is NO, the subroutine proceeds to step S60, on the assumption that the evaporated fuel treatment system 20 is ready for execution in the correction check mode, where the pressure recovery mode execution enable flag F_EVAP3 is set to “0,” the correction check mode execution enable flag F_EVAP4 is set to “1,” and the timer value T of the leak determination timer is set to zero, followed by termination of the pressure recovery mode processing. The pressure recovery mode execution enable flag F_EVAP3 set to “0” at step S60 causes the determination result at step S51 to be NO in the next and subsequent loops of this subroutine, in which case, the subroutine proceeds to the correction check mode at the aforementioned step S6 in FIG. 2, skipping steps S52–S60.

Next, details of the correction check mode processing at step S6 will be described with reference to FIG. 6. The correction check mode processing, as described below, keeps the three valves 30–32 closed for a predetermined correction check time T4, and determines the presence or absence of a leak in the closed state.

Figure 6:
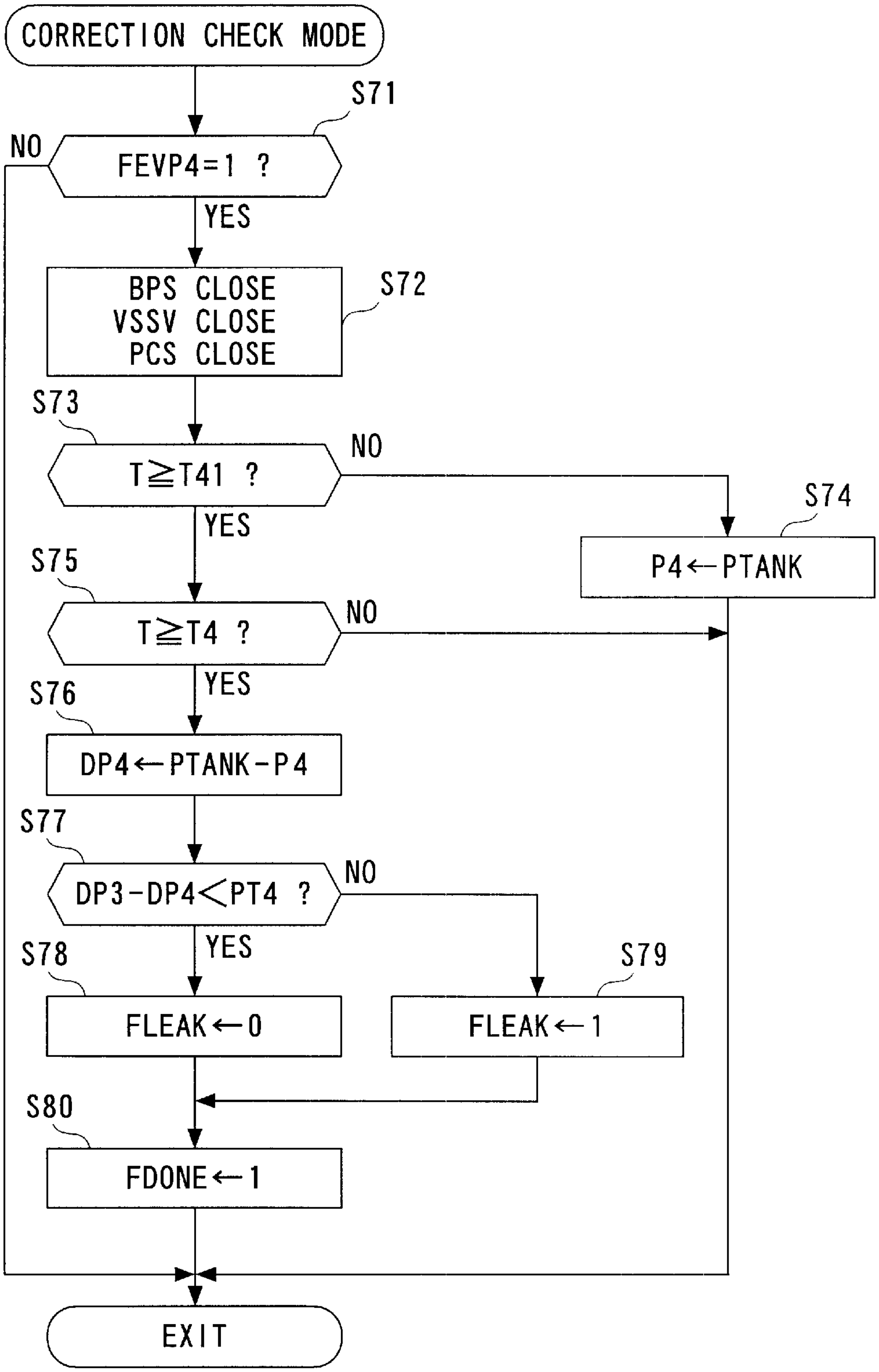
FIG. 6 is a flow chart illustrating a subroutine in a correction check mode in FIG. 2.

In the subroutine illustrated in FIG. 6, it is first determined at step S71 whether or not the correction check mode execution enable flag F_EVAP4 is “1.” If the determination result at step S71 is NO, the correction check mode processing is terminated on the assumption that the evaporated fuel treatment system 20 is not ready for execution in the correction check mode. On the other hand, if the determination at step S71 is YES, the subroutine proceeds to step S72, where the bypass valve 40, bent shut valve 31 and purge control valve 32 are all kept closed.

Next, the subroutine proceeds to step S73, where it is determined whether or not the timer value T of the leak determination timer is equal to or larger than a predetermined delay time T41 (for example, 0.5 sec). If the determination result at step S73 is NO, indicating that the predetermined delay time T41 has not elapsed after the transition to the correction check mode, the subroutine proceeds to step S74, where the current inner tank pressure value PTANK is set as a fourth detected pressure P4, followed by termination of the correction mode check processing.

On the other hand, if the determination result at step S73 is YES, indicating that the predetermined delay time T41 has elapsed after the transition to the correction check mode, the subroutine proceeds to step S75, where it is determined whether or not the timer value T is equal to or larger than a predetermined correction check time T4 (for example, 30 sec). If the determination result at step S75 is NO, indicating that the predetermined correction check time T4 has not elapsed from the transition to the correction check mode, the correction check mode processing is terminated. On the other hand, if the determination result at step S75 is YES, indicating that the predetermined correction check time T4 has elapsed from the transition to the correction check mode, the subroutine proceeds to step S76, where the fourth detected pressure P4 is subtracted from the current inner tank pressure value PTANK, and the resulting value is set as a fourth differential pressure DP4. Thus, the fourth differential pressure DP4 represents the amount of variations in the inner tank pressure PTANK between the time at which the predetermined delay time T41 has elapsed from the start of the correction check mode and the time at which the correction check mode is terminated.

Next, the subroutine proceeds step S77, where it is determined whether or not a difference between the third differential pressure DP3 and the fourth differential pressure DP4 (DP3–DP4) calculated at step S76 is lower than a fourth threshold value PT4. If the determination result at step S77 is YES, indicating that there is a small difference between the amount of variations in the inner tank pressure PTANK in the pressure recovery mode and the amount of variations in the inner tank pressure PTANK in the correction check mode, it is determined that the evaporated fuel treatment system 20 is free from a leak, on the assumption that an increase in the inner tank pressure PTANK in the leak check mode is caused by an excessive evaporated fuel. Then, the subroutine proceeds to step S78, where the leak determination flag FLEAK is set to "0" for indicating to that effect. Next, the subroutine proceeds to step S80 where the leak determination end flag FDONE is set to "1" for indicating that the leak determination is terminated, followed by termination of the correction check mode processing.

On the other hand, if the determination result at step S77 is NO, indicating that there is a large difference between the amount of variations in the inner tank pressure PTANK in the pressure recovery mode and the amount of variations in the inner tank pressure PTANK in the correction check mode, it is determined that the evaporated fuel treatment system 20 is now experiencing a leak equivalent to a hole of a predetermined diameter, on the assumption that a leak is a main cause of an increase in the tank inner pressure PTANK in the leak check mode in spite of a small amount of evaporated fuel. The subroutine proceeds to step S79, where the leak determination flag PLEAK is set to "1" for indicating to that effect. Then, after executing the aforementioned step S80, this subroutine is terminated.

Figure 7:
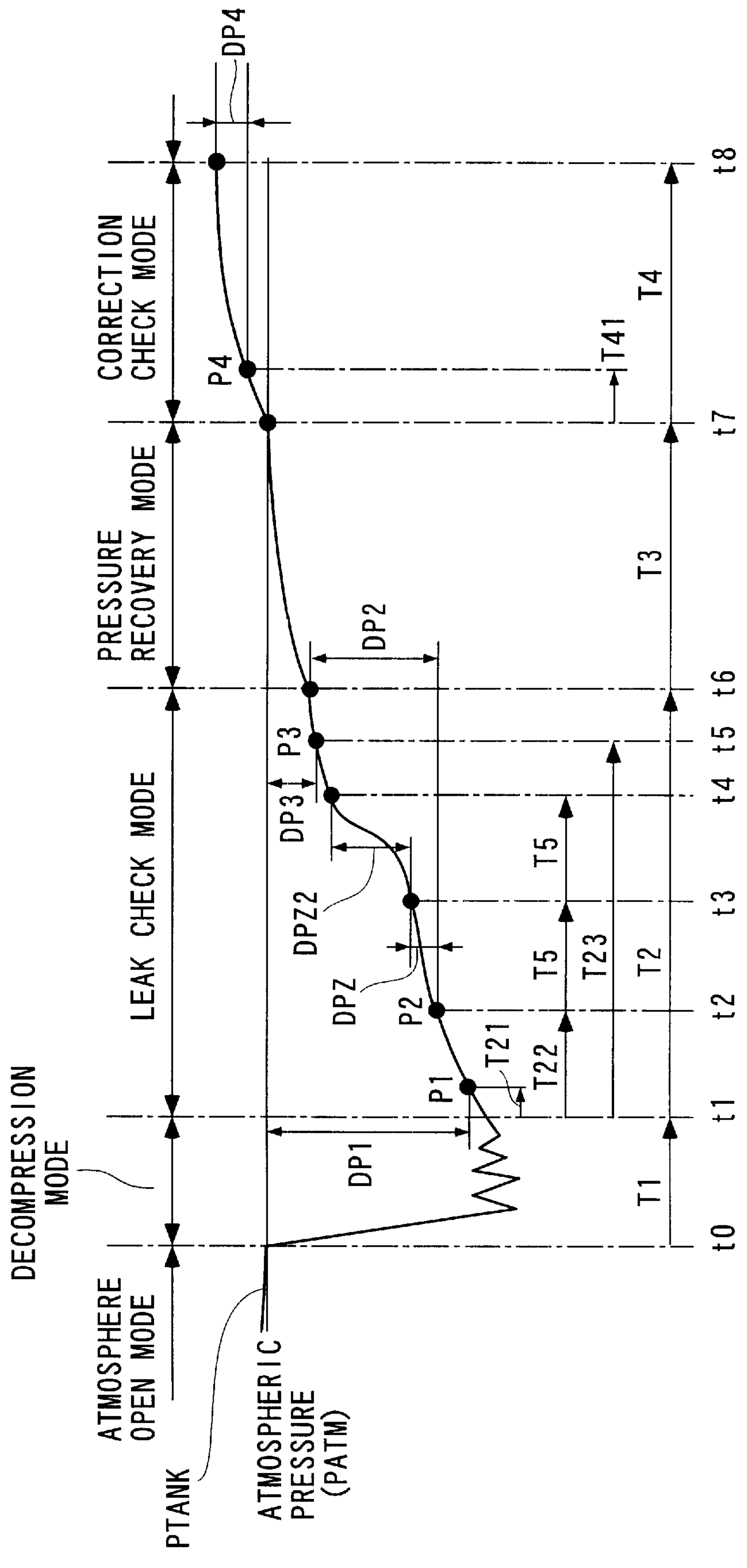
FIG. 7 is a timing chart showing an exemplary transition of an inner tank pressure PTANK when sloshing occurs upon execution of the leak determination processing.

Next, an exemplary transition of the inner tank pressure PTANK found when the foregoing leak determination processing is executed will be described with reference to a timing chart shown in FIG. 7. FIG. 7 shows a transition of the inner tank pressure PTANK when sloshing occurs in the leak check mode.

As shown in FIG. 7, first, as a decompression is started in the decompression mode (at time t0), the inner tank pressure PTANK is reduced. Subsequently, as the inner tank pressure PTANK is reduced to a predetermined negative pressure, the purge control valve 32 is closed at the time a predetermined decompression time T1 has elapsed (at time t1), followed by a transition to the leak check mode. Subsequently, the inner tank pressure PTANK is gradually increased, and the first detected pressure P1 is sampled at the time a second predetermined time T22 has elapsed. Next, at the time a second predetermined time T22 has elapsed (at time t2), the second detected pressure P2 is sampled, and the preceding reference pressure value PY (the inner tank pressure PTANK a predetermined slosh determining time T5 before time t3) is subtracted from the current reference pressure value PX (the inner tank pressure PTANK at time t3) to calculate the reference differential pressure DPZ at the time (time t3) a predetermined slosh determination time T5 has elapsed.

Again, at the time (at time t4) the predetermined slosh determination time T5 has elapsed at this time, the preceding reference pressure value PY (the inner tank pressure PTANK the predetermined slosh determination time T5 before time t4) is subtracted from the current reference pressure value PX (the inner tank pressure PTANK at time t4) to calculate the current reference differential pressure value DPZ2. Simultaneously with this, the reference differential pressure difference DDPZ, which is the difference between the current reference differential pressure value DPZ2 and the preceding reference differential pressure value DPZ1 (reference differential pressure DPZ), is calculated, and is compared with the slosh determining threshold value DDPZG. In this event, if the sloshing causes the reference differential pressure difference DDPZ to increase to the slosh determining threshold value DDPZG or higher, the slosh correction value DDPZHOSEI is calculated, and the second differential pressure DP2 is calculated using the inner tank pressure corrected with this slosh correction value DDPZHOSEI. Then, at the time the third predetermined time T23 has elapsed (at time t5), the third detected pressure P3 is sampled. Further, at the time a predetermined leak check time T2 has elapsed (at time t6), the leak check mode is terminated, followed by the start of the pressure recovery mode.

In the pressure recovery mode, as described above, the leak determination is made based on the third differential pressure when the second differential pressure DP2 is lower than the second threshold value PT2. On the other hand, when the second differential pressure PD2 is equal to or higher than the second threshold value PT2, the leak determination is not made, and the correction check mode is started at the time (time t7) the predetermined pressure recovery time T3 has elapsed, on condition that the first differential pressure PD1 is lower than the first threshold value PT1. Subsequently, the fourth detected pressure P4 is sampled at the time the predetermined delay time T41 has elapsed. Then, at the time the predetermined correction check time T4 has elapsed (time t8), the fourth differential pressure DP4 is calculated, and the difference (DP3–DP4) between the third differential pressure DP3 and the fourth differential pressure DP4 is compared with the fourth threshold value PT4 to execute the leak determination.

In the foregoing manner, the leak determining apparatus 1 according to this embodiment determines the presence or absence of a leak in the evaporated fuel treatment system 20 using the first-fourth differential pressures DP1–DP4 which are calculated based on the inner tank pressure PTANK in the evaporated fuel treatment system 20 during the leak determination processing. The leak determining apparatus 1 also determines whether or not sloshing occurs using the reference differential pressure DPZ which is the difference between the value of the inner tank pressure PTANK in the evaporated fuel treatment system 20 detected in the leak check mode and the value of the inner tank pressure PTANK the predetermined slosh determination time T5 before that, based on the result of a comparison between the reference differential pressure difference DDPZ which is the difference between the current value DPZ2 and the preceding value DPZ1 of the reference differential pressure DPZ. As a result, when determining that sloshing occurs, the leak determining apparatus 1 calculates the second differential pressure DP2 for use in the leak determination by subtracting the slosh correction value DDPZHOEI corresponding to an increase in pressure due to the sloshing from the inner tank pressure PTANK, and using the resulting value as the inner tank pressure. In this manner, when determining that the sloshing occurs, the leak determining apparatus 1 calculates the second differential pressure DP2 for use in the leak determination, intended for eliminating the influence of the increase in pressure caused by the sloshing, so that, unlike the prior art, even if the sloshing is present, the leak determination can be appropriately performed while maintaining a determination accuracy as high as that when no sloshing occurs. In this manner, even under condition that the sloshing could occur, the leak determining apparatus 1 can execute the leak determination for the evaporated fuel treatment system 20 without suspension, thereby making it possible to rapidly and accurately provide a leak determination result.

It should be noted that the determination as to the presence or absence of sloshing is not limited to the approach described in the foregoing embodiment which involves the comparison of the reference differential pressure difference DDPZ, which is the difference between the current value DPZ2 and preceding value DPZ1 of the reference differential pressure, with the sloshing determining threshold value DDPZG, but may be made by comparing a ratio of the current value DPZ2 to the preceding value DPZ1 of the reference differential pressure with a predetermined value. Further alternatively, the determination as to the presence or absence of sloshing may be made by calculating a reference pressure ratio of the current value PX to the preceding value PY of the reference pressure and comparing the ratio of the current value to the preceding value of the reference pressure with a predetermined value.

Also, when determining that sloshing occurs, the third differential pressure DP3 may be calculated at step S54 by subtracting the slosh correction value DDPZHOSEI from the current value PTANK of the inner tank pressure, and using the resulting value as the current value PTANK of the inner tank pressure.

Further, while the foregoing embodiment shows an example of leak determination which is intended for a space closer to the fuel tank 21 than the bypass valve 30 and two-way valve 27 by closing the bypass valve 30 in the leak check mode, the leak determination may be intended for the overall evaporated fuel treatment system 20 including a space near the canister 24 by leaving the bypass valve 30 opened in the leak check mode, in place of or in addition to the foregoing example. In the latter case, it is possible to locate whether a leak is closer to the canister 24 or the fuel tank 21 than the bypass valve 30 by executing both the two forms of leak determinations.

As described above, the leak determination processing apparatus for the evaporated fuel treatment system according to the present invention can make the leak determination for the evaporated fuel treatment system without suspension even under condition that variations in fuel level could occur, and can accurately provide a leak determination result.

What is claimed is:

1. A leak determining apparatus for an evaporated fuel treatment system for temporarily adsorbing an evaporated fuel generated in a fuel tank in a canister, and supplying the evaporated fuel to an intake system of an internal combustion engine, said apparatus comprising:

pressure detecting means for detecting a pressure in said evaporated fuel treatment system;

leak determining means for determining the presence or absence of a leak in said evaporated fuel treatment system in accordance with a pressure detected in said evaporated fuel treatment system during a predetermined leak determination period;

fuel variation determining means for determining whether or not variations in fuel occur in said fuel tank in accordance with a change in the pressure of said evaporated fuel treatment system detected during said leak determination period; and correcting means for correcting the value of said detected pressure for use in said leak determination based on the change in pressure detected in said evaporated fuel treatment system when said fuel variation determining means determines that the variations in fuel occur.

2. A leak determining apparatus for an evaporated fuel treatment system for temporarily adsorbing an evaporated fuel generated in a fuel tank in a canister, and supplying the evaporated fuel to an intake system of an internal combustion engine, said apparatus comprising:

a pressure detecting module for detecting a pressure in said evaporated fuel treatment system;

a leak determining module for determining the presence or absence of a leak in said evaporated fuel treatment system in accordance with a pressure detected in said evaporated fuel treatment system during a predetermined leak determination period;

a fuel variation determining module for determining whether or not variations in fuel occur in said fuel tank in accordance with a change in the pressure of said evaporated fuel treatment system detected during said leak determination period; and a correcting module for correcting the value of said detected pressure for use in said leak determination based on the change in pressure detected in said evaporated fuel treatment system when said fuel variation determining module determines that the variations in fuel occur.

3. A leak determining method for an evaporated fuel treatment system for temporarily adsorbing an evaporated fuel generated in a fuel tank in a canister, and supplying the evaporated fuel to an intake system of an internal combustion engine, said method comprising the steps of:

detecting a pressure in said evaporated fuel treatment system;

for determining the presence or absence of a leak in said evaporated fuel treatment system in accordance with a pressure detected in said evaporated fuel treatment system during a predetermined leak determination period;

determining whether or not variations in fuel occur in said fuel tank in accordance with a change in the pressure of said evaporated fuel treatment system detected during said leak determination period; and correcting the value of said detected pressure for use in said leak determination based on the change in pressure detected in said evaporated fuel treatment system when determining that the variations in fuel occur.

4. An engine control unit including a control program for causing a computer to carry out a leak determination for an evaporated fuel treatment system for temporarily adsorbing an evaporated fuel generated in a fuel tank in a canister, and supplying the evaporated fuel to an intake system of an internal combustion engine, wherein said control program causes said computer to detect a pressure in said evaporated fuel treatment system; determine the presence or absence of a leak in said evaporated fuel treatment system in accordance with a pressure detected in said evaporated fuel treatment system during a predetermined leak determination period; determine whether or not variations in fuel occur in said fuel tank in accordance with a change in the pressure of said evaporated fuel treatment system detected during said leak determination period; and correct the value of said detected pressure for use in said leak determination based on the change in pressure detected in said evaporated fuel treatment system when determining that the variations in fuel occur.

* * * * *